(12) United States Patent
Bailey et al.

(10) Patent No.: US 12,260,231 B2
(45) Date of Patent: Mar. 25, 2025

(54) SOFTWARE USER EXPERIENCE TRANSITION ASSISTANCE

(71) Applicant: INTERNATIONAL BUSINESS MACHINES CORPORATION, Armonk, NY (US)

(72) Inventors: Logan Bailey, Atlanta, GA (US); Zachary A. Silverstein, Georgetown, TX (US); Suman Patra, Kolkata (IN); Tiberiu Suto, Franklin, NY (US)

(73) Assignee: International Business Machines Corporation, Armonk, NY (US)

( * ) Notice: Subject to any disclaimer, the term of this patent is extended or adjusted under 35 U.S.C. 154(b) by 118 days.

(21) Appl. No.: 18/355,319

(22) Filed: Jul. 19, 2023

(65) Prior Publication Data
US 2025/0028541 A1    Jan. 23, 2025

(51) Int. Cl.
*G06F 9/451* (2018.01)
*G06F 16/957* (2019.01)

(52) U.S. Cl.
CPC .......... *G06F 9/451* (2018.02); *G06F 16/9577* (2019.01)

(58) Field of Classification Search
CPC .............................. G06F 9/451; G06F 16/9577
See application file for complete search history.

(56) References Cited

U.S. PATENT DOCUMENTS

| | | | |
|---|---|---|---|
| 8,914,736 B2 | 12/2014 | Cardasco | |
| 9,740,479 B2 | 8/2017 | Diao et al. | |
| 10,459,828 B2 | 10/2019 | Seibert, Jr. et al. | |
| 10,540,072 B2 * | 1/2020 | Merkin | G06Q 10/0639 |
| 10,666,529 B2 | 5/2020 | Lundberg et al. | |
| 11,487,639 B2 | 11/2022 | Sharma | |
| 11,789,715 B2 * | 10/2023 | Gass | G06F 8/443 |
| | | | 717/168 |
| 12,020,008 B2 * | 6/2024 | Mohanram | G06N 20/00 |
| 2007/0121164 A1 * | 5/2007 | Il | G06K 15/02 |
| | | | 358/1.18 |
| 2011/0078667 A1 * | 3/2011 | Dolby | G06Q 10/10 |
| | | | 717/133 |
| 2012/0054022 A1 * | 3/2012 | Kosashvili | G06Q 30/0242 |
| | | | 705/14.43 |
| 2016/0307277 A1 * | 10/2016 | Wengrower | G06F 16/9535 |
| 2017/0169792 A1 * | 6/2017 | Zou | H04L 63/0428 |

FOREIGN PATENT DOCUMENTS

WO    2022057097 A1    3/2022

* cited by examiner

*Primary Examiner* — Tadesse Hailu
(74) *Attorney, Agent, or Firm* — Michael A. Petrocelli

(57) ABSTRACT

Optimizing a user experience during transition to an updated user interface includes using a computer processor to capture a user experience of a user's interaction with a program based on migration of the user interface from a current version of a page layout associated with the user to a new version of the page layout associated with the user. Disparity events experienced by the user while transitioning from the current version of the page layout to the new version of the page layout are analyzed, and a recommendation report of changes to the user interface is generated and sent to a developer associated with the new version of the page layout. An updated page layout reflecting modifications may then be received based on the recommendation report.

20 Claims, 4 Drawing Sheets

SOFTWARE USER EXPERIENCE TRANSITION ASSISTANCE

BACKGROUND

The present invention relates in general to computing systems, and more particularly, to optimizing a user experience (UX) of software/programs through improved software-version transition assistance during updates to a user interface (UI), by one or more computing processors.

SUMMARY

According to an embodiment, a method for optimizing a user experience during transition to an updated user interface is provided. In certain implementations, one or more processors capture a user experience of a user's interaction with a program based on migration of a user interface from a current version of a page layout associated with the user to a new version of the page layout associated with the user. The one or more processors analyze disparity events experienced by the user while transitioning from the current version of the page layout to the new version of the page layout, and generate a recommendation report of changes to the user interface based on the analyzing. The one or more processors send the recommendation report to a developer associated with the new version of the page layout, and receive an updated page layout reflecting modifications to the new version of the page layout, based on the recommendation report.

An embodiment includes a computer usable program product. The computer usable program product includes a computer-readable storage device, and program instructions stored on the storage device executable to perform similar functionality.

An embodiment includes a computer system. The computer system includes a processor, a computer-readable memory, and a computer-readable storage device, and program instructions stored on the storage device for execution by the processor via the memory to perform similar functionality.

DETAILED DESCRIPTION OF THE DRAWINGS

Figure 1:
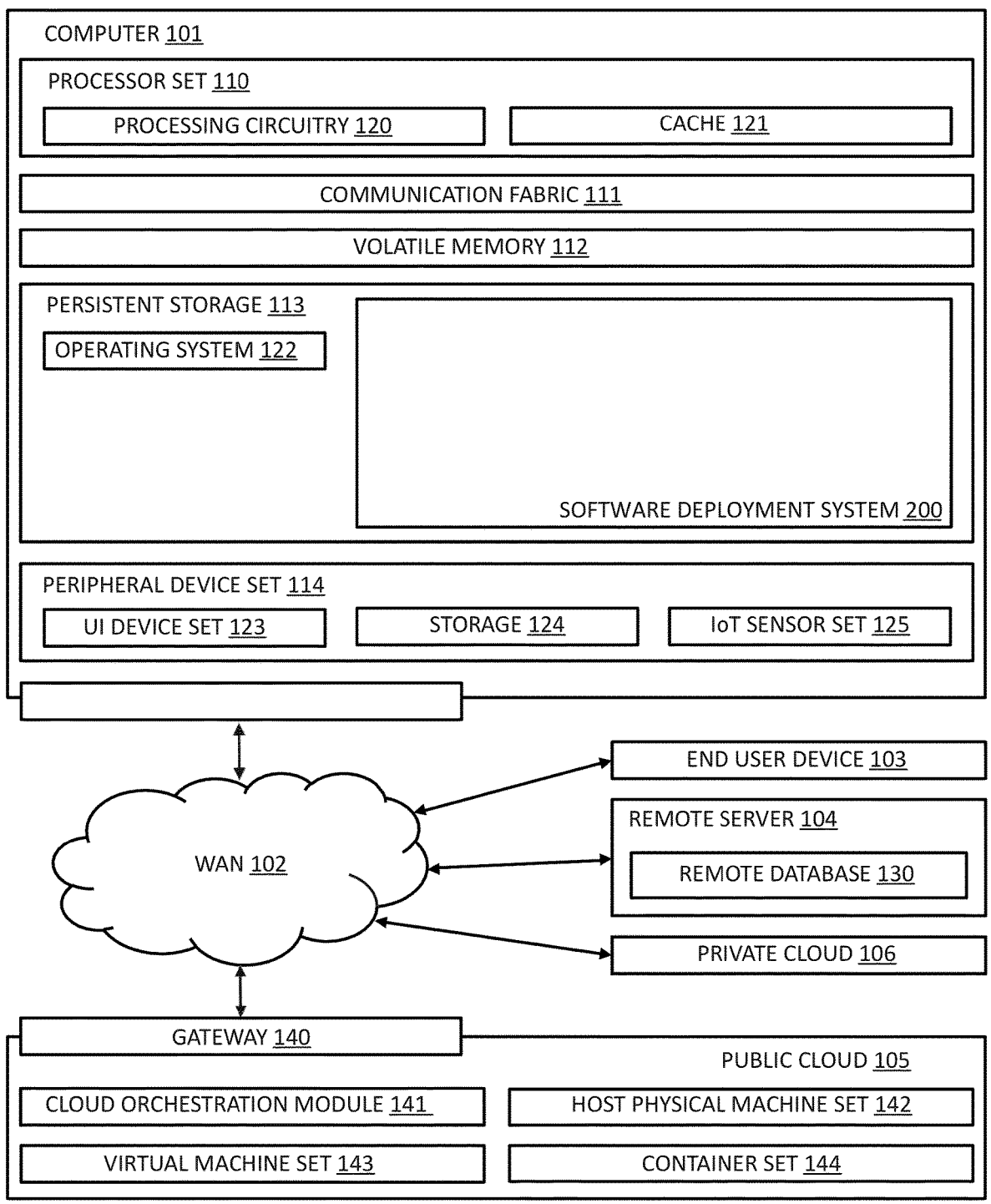
FIG. 1 is a block diagram depicting a computing environment in which functions of the description may be performed.

The technical solutions described herein facilitate the optimizing of a user experience during transition periods of updates to a user interface of software/programs. A common goal of developers building software products is to provide a seamless experience to the user. This includes providing user interface elements and navigation of the product at a positioning which is familiar to the user, while at times adding new features to the product or making necessary or desirable updates. However, sometimes when software products are updated, users find the layout of the new (updated) user interface less than desirable, especially after having spent some amount of time with the program.

For example, because of the limited amount of space available on user interfaces, when upgrading a product to include new functionality (or update existing functionality), the developer must make a choice to reposition interface elements (e.g., buttons, icons, navigational tools, search boxes, etc.) from its previous location to make room for interface elements associated with the update. When this occurs, those users (and particularly those individuals working frequently with the product) may get frustrated that the new platform version does not include interface elements it should include, or includes interface elements which have been added or repositioned to locations on the interface which the user believes is illogical and hindering effective workflow. Making matters worse, the users who are oftentimes affected most negatively by this situation are those users who interact with the system the most, relative to other users.

Accordingly, the embodiments herein provide novel solutions to monitor and access user interaction transitions during times of product updates resulting in user interface changes. In certain embodiments, the technical solutions presented herein provide functionality to ad-hoc guide users from a multi-version site (A,B) to a new (updated) version with embedded user experience assistance, even providing mechanisms to allow users to recommend a modified (C) format which may be returned to developers based on usage. These functionalities aide users in navigating (and/or facilitating recommending further revision) to a user interface, minimizing workflow and product adoption time and effort.

In some embodiments, the inventive system captures user migration changes from a previous version of a page on a user interface of a program to a new (updated) version of the page, and automatically provide assistance to the user upon detecting user experience disparity. In certain aspects, the inventive system detects user experience disparity events (e.g., user mistakes, mis-navigations, statistically significant user wait times, non-progressing clicks, etc.), identify interface pain points at aggregate over multiple users, and use these detected events to recommend primary user experience changes based on the history of consuming users. In certain aspects, the inventive system may further allow users to simulate moving a user interface element to a new location on the interface, capture the location, and crowdsource data associated with the captured location to generate new potential interface layouts being the most productive for the largest amount of users consuming the product.

In some embodiments, at least some of the functionality described herein (e.g., generating models) is performed utilizing a cognitive analysis. The cognitive analysis may include classifying natural language, analyzing tone, and analyzing sentiment with respect to, for example, information associated with a particular software product (and/or a user interface associated with the software product), content and communications associated with the software product, and/or other available data sources. In some embodiments, natural language processing (NLP), natural language understanding (NLU), and/or natural language generation (NLG) may be used to conduct analyses (e.g., determine a nature of interactions of between users and the user interface of the software product), determine working parameters, identify patterns (e.g., usage patterns), perform usage simulations, output recommendations to a user, and the like.

In some implementations, the cognitive analysis may include analyses on additional data which is not text-based. For example, Mel-frequency cepstral coefficients (MFCCs) (e.g., for audio content), and/or region-based convolutional neural network (R-CNN) pixel mapping (e.g., for images/videos), as are commonly understood, are used. As such, it should be understood that the methods/systems described herein may be applied to content other than text-based (or alphanumeric) content but also audio content and/or images/videos (i.e., utilizing sensory input devices, such as a camera and/or microphone proximal to the user).

The processes described herein may utilize various information or data sources associated with users (e.g., users who are associated with and/or utilize a user interface of a software product). With respect to users, the data sources may include, for example, any available data sources associated with the user. For example, in some embodiments, a profile (e.g., a cognitive profile) for the user(s) may be generated. Data sources that may be use used to generate a cognitive profile for the user(s) may include any appropriate data sources associated with the user that are accessible by the system (perhaps with the permission or authorization of the user, for example, user's whom opt-in to the inventive functionality). Examples of such data sources include, but are not limited to, audio/video data capturing an environment and/or utterances/expressions made by the user, communication sessions and/or the content (or communications) thereof (e.g., phone calls, video calls, text messaging, emails, in person/face-to-face conversations, etc.), a profile of (or basic information about) the user (e.g., job title, place of work, length of time at current position, family role, etc.), a schedule or calendar (i.e., the items listed thereon, time frames, etc.), projects (e.g., past, current, or future work-related projects), location (e.g., previous and/or current location and/or location relative to other users), social media activity (e.g., posts, reactions, comments, groups, etc.), browsing history (e.g., web pages visited), and online purchases.

With respect to the software product, the data sources may include, for example, any available data sources associated with the software product (inclusive of services and/or workflows involving the product). Examples of such data sources include, but are not limited to, metrics, key performance indicators (KPIs), parameters, resource usage, simulation outcomes, usage patterns, machine learning model data (including forecasting data), and user feedback.

As such, in some embodiments, the methods and/or systems described herein may utilize a "cognitive analysis," "cognitive system," "machine learning," "cognitive modeling," "predictive analytics," and/or "data analytics," as is commonly understood by one skilled in the art. Generally, these processes may include, for example, executing machine learning logic or program code to receive and/or retrieve multiple sets of inputs, and the associated outputs, of one or more systems and processing the data (e.g., using a computing system and/or processor) to generate or extract models, rules, etc. that correspond to, govern, and/or estimate the operation of the system(s), or with respect to the embodiments described herein, the generation of user experience models, as described herein. Utilizing the models, the performance (or operation) of the system (e.g., utilizing/based on new inputs) may be predicted and/or the performance of the system may be optimized by investigating how changes in the input(s) effect the output(s). Feedback received from (or provided by) users and/or developers may also be utilized, which may allow for the performance of the system to further improve with continued use.

In certain embodiments, the cognitive analyses described herein may apply one or more heuristics and machine learning based models using a wide variety of combinations of methods, such as supervised learning, unsupervised learning, temporal difference learning, reinforcement learning and so forth. Some non-limiting examples of supervised learning which may be used with the present technology include averaged one-dependence estimators (AODE), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, distributed autonomous entity systems based interaction (IBSEAD), association rule learning, apriori algorithm, Equivalence Class Clustering and bottom-up Lattice Traversal (ECLAT) algorithm, Frequent Pattern (FP)-growth algorithm, hierarchical clustering, single-linkage clustering, conceptual clustering, partitional clustering, k-means algorithm, fuzzy clustering, and reinforcement learning. Some non-limiting examples of temporal difference learning may include Quality (Q)-learning and learning automata. Specific details regarding any of the examples of supervised, unsupervised, temporal difference or other machine learning described in this paragraph are known and are considered to be within the scope of this disclosure.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as software deployment system 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
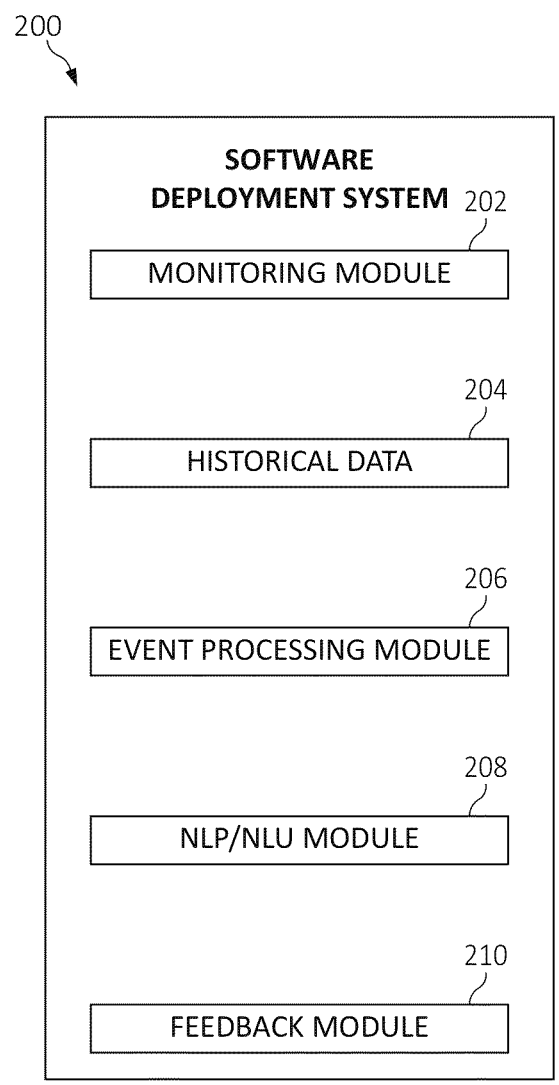
FIG. 2 is a block diagram depicting a software deployment system, implemented by the computing environment of FIG. 1, and modules illustrating a functional relationship between various functionalities performed by the system in the computing environment.

Turning now to FIG. 2, a block diagram further illustrating the software deployment system 200 of FIG. 1 is depicted. As will be seen, many of the blocks in FIG. 2 may be considered "sub-modules" or "components" of the module's functionality; and one or more of the sub-modules, components, services, applications, and/or functions described in FIG. 2 are used in and/or executed by the computing environment of FIG. 1.

In an embodiment, software deployment system 200 includes a monitoring module 202, a historical database 204, an event processing module 206, an NLP/NLU module 208, and a feedback module 210. As one of ordinary skill in the art will appreciate, the depiction of the various functional units in the software deployment system 200 is for purposes of illustration, as the functional units may be located and/or executed by the computer 101 or elsewhere within and/or between distributed computing components. Further, the individual components of the software deployment system 200 may collectively represent a model, such as a machine learning model.

That is, the inputs to the components described following may commensurately define inputs to train and generate the machine learning model (e.g., a "software deployment model") using machine learning techniques. The data and parameters described following may similarly represent the variables and/or features of the machine learning model, and the outputs described following may include a resultant output, prediction, and/or recommendation by the machine learning model. Said differently, each of the following components, and the respective functionality performed therein, may represent one or more steps and/or stages to train, generate, output, and optimize the machine learning model unless otherwise explicitly specified.

As will be described further, following, once deployment of a new user interface/user experience has been initiated, the monitoring module 202 may monitor user migration from a previous version of a page layout of the interface to a new (updated) version. In one aspect, the monitoring module 202 may identify similar or related interface elements of previous versions of a page layout in a new (updated) version of the page layout utilizing NLP of field names of those interface elements of the previous and new pages. That is, the monitoring module 202 may identify, for example, a certain menu or button between previous and new versions of a page layout based on the field names of those items, even when the certain menu or button has been relocated to a new position within the (new) layout.

The monitoring module 202 may utilize this similar/related interface element information, among other information, to identify disparity events affecting the user. These events may include, for example, user mistakes (e.g., user selection of an icon/button of which the user believes will perform certain functionality when in fact the selected icon/button performs a different functionality than the user desired), mis-navigations (e.g., user navigation to a certain menu, button, or icon to select desired functionality which is in fact located in a different menu, button, or icon), statistically significant user wait times (e.g., idle times in which the user is searching for elements to perform a desired functionality), and/or non-progressing clicks (e.g., missed clicks or reversing of element/menu selection).

The historical database 204 may collect and store data associated with the disparity events, user metrics, KPIs, parameters, resource usage, simulation outcomes, usage patterns, and/or machine learning model data (including forecasting data). In one aspect, the historical database 204, in collaboration with the monitoring module 202, may compute and determine the user's completion time of a particular case or process utilizing a previous version of the software product, and store this data for comparison to a completion time of the particular case or process when performed utilizing the new (updated) version of the software product. For example, a time may be computed (during utilization of the previous version of the software product) in which it takes the user to successfully complete a routine task (provisioning of a storage volume, for example). This time may be recorded in the historical database 204, and compared to a time in which it takes the user to perform the same (or similar) task using the updated interface. The historical database 204 may additionally store similar aggregate data from a plurality of users utilizing the software product to perform these and other comparisons and analyses.

The event processing module 206 may, in collaboration with the monitoring module 202 and historical database 204, receive and analyze the disparity events associated with users of the software product. In one aspect, the event processing module 206 may, for example, perform he computation of the completion times of the particular tasks in which the data associated therewith is recorded in the historical database 204. The event processing module 206 may further process task mining of pages of the user interface, capturing and analysis of client-side web browser interaction monitoring, and NLP/NLU modeling, as will be further described. Additionally, the event processing module 206 may aggregate events from a plurality of users utilizing the software product to identify patterns, trends, and the like.

The NLP/NLU module 208 may, in conjunction with the monitoring module 202, the historical database 205, and the event processing module 206, monitor and analyze video and/or audio content detected as being captured of the user by sensor input devices (e.g., camera and/or microphone devices consisting as part of UI device set 123). The NLP/NLU module 208 may classify natural language, analyze tone, and analyze sentiment with respect to, for example, information associated with the software product (and/or the user interface associated with the software product), content and communications associated with the software product, and/or other available data sources. In one aspect, the NLP/NLU module 208 may further analyze user gaze direction, detect physical user expressions (e.g., facial expressions and/or body language), and/or classify utterances made by the user with respect to the software product. The NLP/NLU module 208 may additionally employ machine learning and/or cognitive analyses to generate models, predictions, and/or recommendations utilizing the analyzed video and/or audio content in association with the data stored in the historical database 204.

The feedback module 210 may, in conjunction with the monitoring module 202, the historical database 205, the event processing module 206, and the NLP/NLU module 208, receive feedback input associated with the new (updated) page layout of the software product. In one aspect, this feedback may include feedback direct from the user(s) via direct input. In another aspect, this feedback may include output of the analyses performed utilizing the detected disparity events and associated data. In still another aspect, this feedback may include output of the machine learning models and cognitive analyses. In certain embodiments, the feedback module 210 may include feedback information associated with simulations performed by the user, in which the user is enabled to simulate changes in the layout of the new (updated) page layout of the interface. For example, the feedback module 210 may collect information associated with the user (or users in aggregate) in which the user has simulated changing the position of a button, menu, etc. of the updated layout to provide feedback to the developer as to desired further revision of the updated page layout of the software product.

Figure 3:
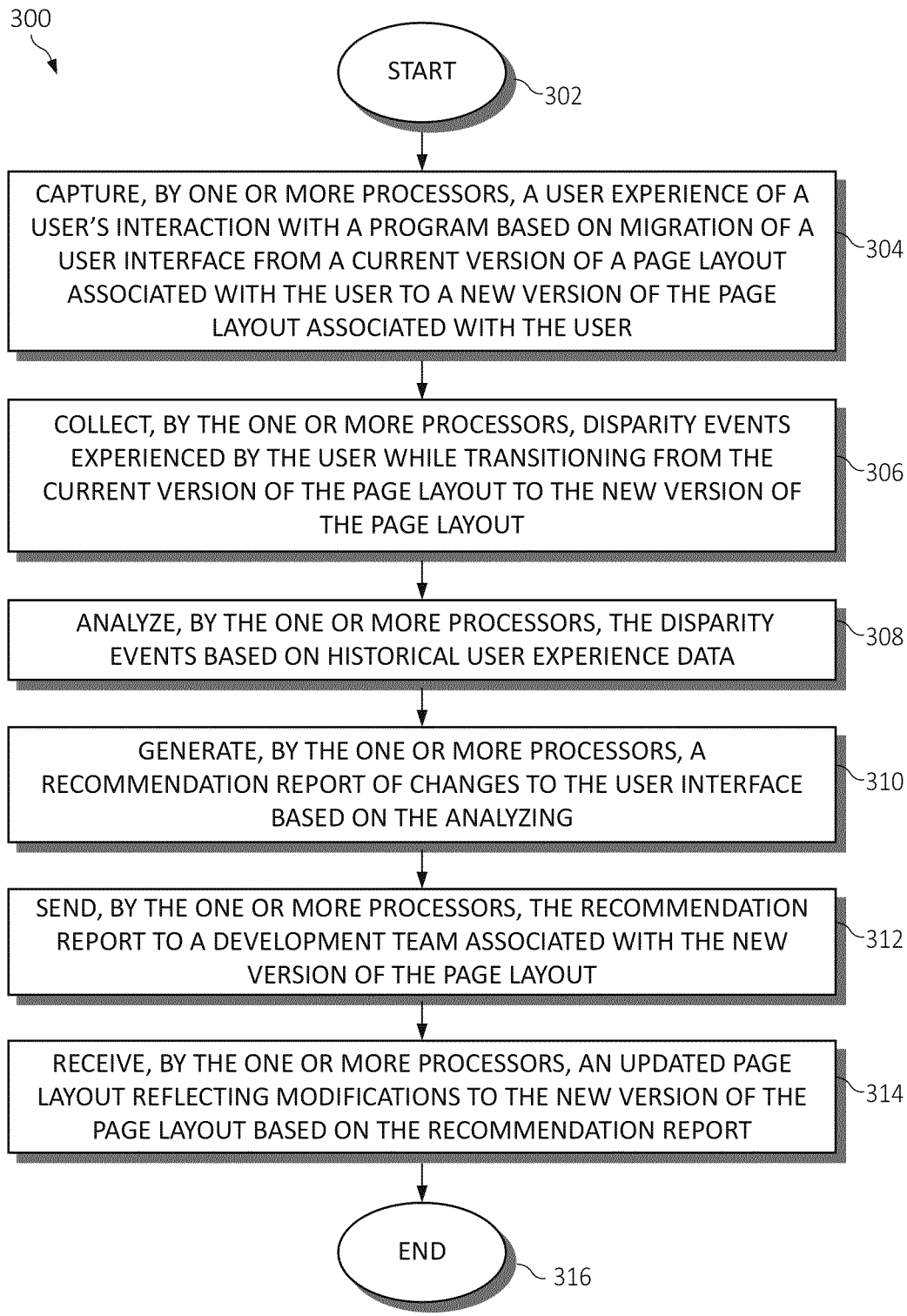
FIG. 3 is a flowchart illustrating a summarized computer-implemented method for optimizing a user experience during transition to an updated user interface.

Turning now to FIG. 3, a computer-implemented method 300 for optimizing a user experience during transition to an updated user interface is illustrated. It should be understood that the operations of the computer-implemented method 300 may be performed by the processor set 110 of the computer 101 depicted in the computing environment 100 of FIG. 1 by executing computer code of the software deployment system 200, commensurate with the description of such in FIGS. 1 and 2.

Starting at step 302, one or more processors capture a user experience of a user's interaction with a program based on migration of a user interface from a current version of a page layout associated with the user to a new version of the page layout associated with the user (step 304). The one or more processors collect disparity events experienced by the user while transitioning from the current version of the page layout to the new version of the page layout (step 306). The one or more processors analyze the disparity events based on historical user experience data (step 308), and generate a recommendation report of changes to the user interface based on the analyzing (step 310). The one or more processors send the recommendation report to a developer (or development team) associated with the new version of the page layout (step 312), and receive an updated page layout reflecting modifications to the new version of the page layout, based on the recommendation report (step 314). The method 300 then ends (step 316).

Figure 4:
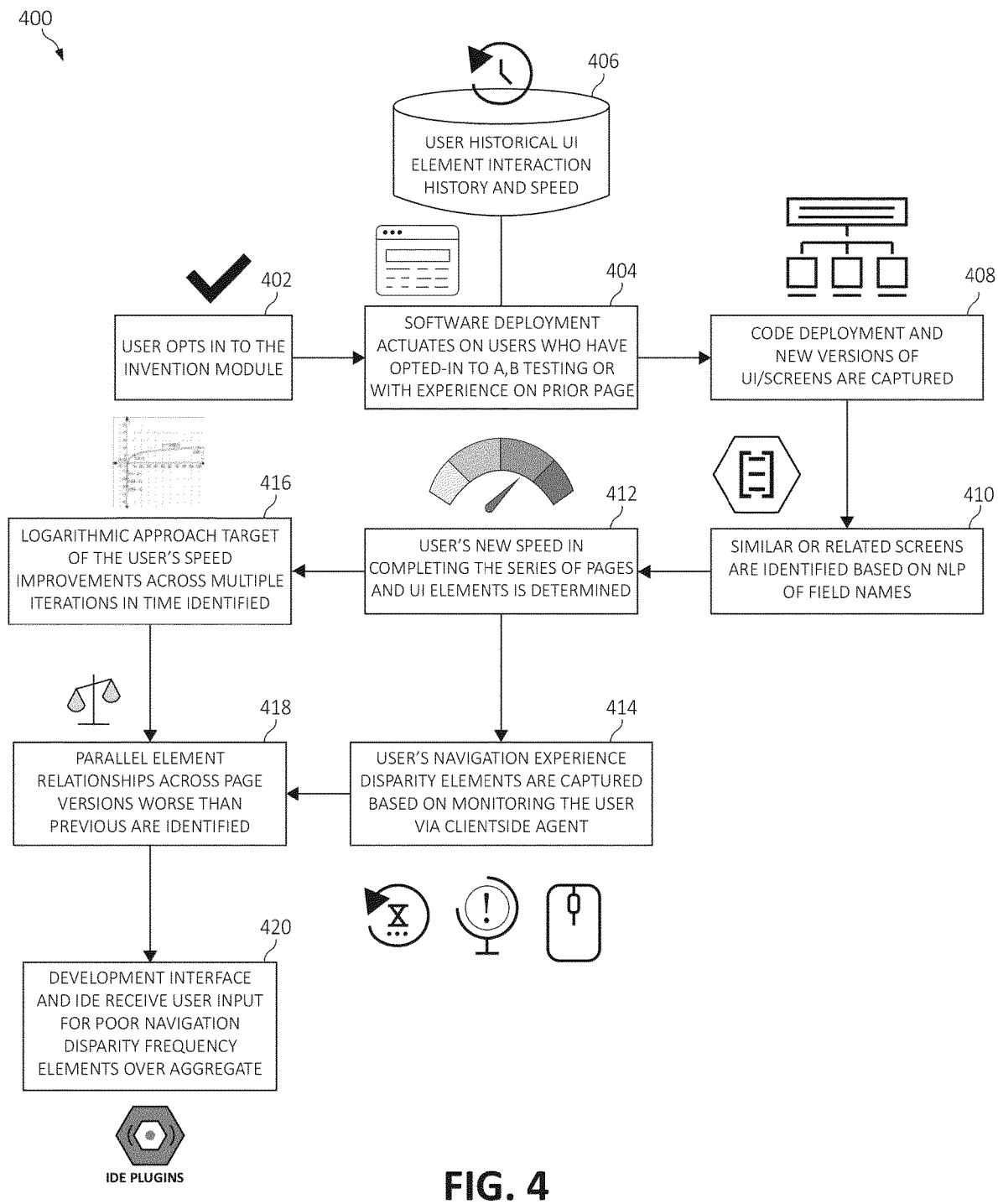
FIG. 4 is a flowchart illustrating operations of a software deployment system for optimizing a user experience during transition to an updated user interface.

To further elaborate on the computer-implemented method 300, FIG. 4 illustrates an additional block diagram depicting operations of the software deployment system 200. As will be seen, many of the blocks in FIG. 3 may be considered "sub-modules" or "components" of the module's functionality; and one or more of the sub-modules, components, services, applications, and/or functions described in FIG. 3 are used in and/or executed by the computing environment of FIG. 1 and consistent with the system 200 of FIG. 2.

Starting at block 402, a user utilizing a particular software product selects (within the software product or otherwise through an external development page) to opt-in to the invention module executed by the software deployment system 200 to participate in the functionality described herein. This includes an agreement, by the user, to participate in a shifting (changing) user interface/user experience (similar, for example, to A,B testing). The user originates on an original version of a page layout of the software product having interface elements in original (existing) positions (locations throughout the interface page).

In block 404, the system 200 activates to those users whom have opted-in upon detection of a new version or version of user interface of the software product being pushed to users. This detection may be performed based on similar page changes, manual user demarcation, or code repository processing. Upon activating, the software deployment system 200 initiates block 406, which includes user historical user interface element interaction history and speed information stored in the historical database 204 of FIG. 2.

Once initiated, the user (as part of the corpus of users whom have opted-in) receive the new version of the page layout of the user interface, and the new version(s) of the page layout(s) of the user interface screens are captured as part of block 408. In block 410, the new version of the page layout may then be compared to the previous version of the page layout to identify similar or related interface elements, screens, and/or interface items utilizing an NLP analysis of field names of these items. In other words, NLP analysis may be used to identify identical or similar interface elements between the previous and new interface versions using a comparison of the field names of those elements.

Utilizing the user historical user interface information of block 406 (stored in the historical database 206), the system 200 begins processing events occurring to users as they begin to utilize the new version of the page layout. For example, the user historical user interface information may be used to predictively aggregate the user's average completion time of a given user interface subset or series of pages (and/or tasks/processes). Here, the system 200 captures the user's previous completion time of a given process utilizing the previous version of the page layout, and compares the previous completion time to a current completion time utilizing the new version of the page layout in block 412.

Under this comparison, if the completion time of a case or process has decreased in aggregate, task mining of the user's screens interacted with under the new version of the page layout are processed. This may include capturing these screens via client-side web browser interaction monitoring, or other collection methods.

At block 414, the system 200 processes user navigation elements as the user navigates through the new version of the page layout. The system 200 searches for and identifies experience disparity events which both discourage the user and lower software productivity. In one embodiment, with user opt-in, video and/or audio data of the user may be captured (i.e., via a webcam/microphone and/or alterative capturing device(s) proximal to the user) to detect user gaze direction as the user attempts to find an element on the new version of the page layout when it may not be located in an expected (familiar) position on the interface. Additionally, the audio data may be processed utilizing NLP and NLU to identify speech/utterances of the user related to the user experience. This data may be parsed to identify relevant utterances (e.g., "Where is the submit button on this form? It used to be at the bottom of the screen and now it isn't there.", or "Where can I find the product lookup page? It isn't under the menu it used to be in.")

Subsequent to analyzing the video and/or audio data and determining an intention of the user, the system 200 may then through some form of animation point to or otherwise draw attention of the user to the new position of the desired interface element and/or automatically move the cursor to the new position of the element on the screen in order to reduce the time taken by the user to identify it. For example, the animation may temporarily use an avatar, highlight, circle, point to (with a displayed arrow), and/or use another form of lighting manipulation of the user interface to demarcate the desired interface element. Additionally, this audio/ video data may be processed by aggregating utterances from multiple users, clustering the utterances (e.g., utilizing K-means and Latent Dirichlet Allocation), and providing this clustered data to the developer by generating suggested changes according to the most relevant clusters.

Continuing with block 414, user experience disparity events, such as user mis-navigation, user idle time, user non-progressing clicks, and/or user experience/user error reception (i.e., based on user input and/or the audio/video data) may be logged and clocked against individual pages and steps of the user interface. That is, individual pages and their associated interface elements (and/or steps taken to select such interface elements) may be clocked and recorded to be compared with previous versions of the given pages.

At block 416, after multiple (i.e., a predetermined number of) iterations of the user interacting with the new version of the page layout of particular page(s), the user's speed, computed at block 412, may be processed against a logarithmic graph (r shape) and the speed approached by the user as displayed in the graph may be expected to comprise any individual interface element's maximum completion speed/rate. Based on this data, a recommendation report may be generated by the system 200 at block 418, and transmitted (sent) to the developer (development team) when a given interface element's logarithmic approaching target is slower than expected, based on historical data from previous versions of the page layout. Further, the system 200 may collect direct feedback from the user for interpretation and intimation of effectiveness of the new version of the page layout, and similarly transmit this feedback to the developer to identify desirable and/or requisite revisions to the interface of the software product.

In one embodiment, this data of user ratings may be continually processed on multiple (i.e., a predetermined number of) consecutive days subsequent to the deployment of the new version of the page layout, and the resulting learning curve analyzed to determine when users (in aggregate) plateau when no further improvement from day-to-day is noted. This baseline (the data associated with the plateau) may be used to determine an overall user experience effectiveness score for a particular user experience implementation. For example, after reviewing data that shows a new implementation (i.e., the new version of the page layout) has a lower user experience effectiveness score than a previous version (even subsequent to allowing a satisfactory amount of time to pass to allow users to adjust to the new interface), a company/development team associated with the software product may decide to revert to a previous version in order to improve productivity and user confidence long-term.

At block 420, in one aspect, the system 200 may include mechanisms which facilitate a user of the software product to simulate moving a user interface element on the new version of the page layout to a location the user would have expected the element to be and/or a location which is most convenient for the particular processing the user performs utilizing the program. Although the interface element may not actually reside in the location simulated by the user, the suggested location on the new version of the page layout is captured by the system 200. In this way, crowdsourced data from multiple users may be analyzed and utilized to generate potential new user experience mock screens/layouts which are most productive for the largest amount of users.

Subsequent to receiving the recommendation reports, feedback, and/or ratings from the users, the developer (development team) may implement the recommendations into a revised page layout of the new version of the page layout of the user interface of the software product. In other words, the new version of the page layout effectively becomes the previous version of the page layout and an updated version of the page layout is then once again developed and deployed to the users via the system 200, at which point the process begins anew as the lifecycle of the software product continues.

In an embodiment consistent with the operations of the computer implemented methods 300 and 400, the analyzing of the disparity events is performed based on historical user experience data.

In an embodiment consistent with the operations of the computer implemented methods 300 and 400, the disparity events consist of user interface mistakes made by the user, mis-navigations made by the user, statistically significant wait times experienced by the user, and/or non-progressing input provided by the user.

In an embodiment consistent with the operations of the computer implemented methods 300 and 400, the disparity events are aggregated over a plurality of users.

In an embodiment consistent with the operations of the computer implemented methods 300 and 400, a change in the new version of the page layout, based on a preference of the user, is simulated by the one or more processors.

In an embodiment consistent with the operations of the computer implemented methods 300 and 400, the disparity events are captured by analysis of at least one of video input associated with the user and audio input associated with the user.

In an embodiment consistent with the operations of the computer implemented methods 300 and 400, the analysis is performed utilizing NLP and/or NLU.

In an embodiment consistent with the operations of the computer implemented methods 300 and 400, the disparity events are logged and timed against individual pages of the program and steps based on a comparison of elements on the individual pages.

It should be noted that, as used herein, the terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

In general, as may be used herein, "optimize" may refer to and/or defined as "maximize," "minimize," "best," or attain one or more specific targets, objectives, goals, or intentions. Optimize may also refer to maximizing a benefit to a user (e.g., to create an optimal user experience of a software product through navigational assistance of an updated user interface and/or facilitating recommendations to further revise the interface made by user(s)). Optimize may also refer to making the most effective or functional use of a situation, opportunity, or resource.

Additionally, optimizing need not refer to a best solution or result but may refer to a solution or result that is "good enough" for a particular application, for example. In some implementations, an objective is to suggest a "best" combination of research methods, parameters, workflow designs, and/or modifications to a product, platform, and/or service. Herein, the term "optimize" may refer to such results based on minima (or maxima, depending on what parameters are considered in the optimization problem). In an additional aspect, the terms "optimize" and/or "optimizing" may refer to an operation performed in order to achieve an improved result such as reduced execution costs or increased resource utilization, whether or not the optimum result is actually achieved. Similarly, the term "optimize" may refer to a component for performing such an improvement operation, and the term "optimized" may be used to describe the result of such an improvement operation.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary, a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer-implemented method for optimizing a user experience during transition to an updated user interface, the computer-implemented method comprising:
   capturing, by one or more processors, a user experience of a user's interaction with a program based on migration of a user interface from a current version of a page layout associated with the user to a new version of the page layout associated with the user;
   analyzing, by the one or more processors, disparity events experienced by the user while transitioning from the current version of the page layout to the new version of the page layout;
   generating, by the one or more processors, a recommendation report of changes to the user interface based on the analyzing;
   sending, by the one or more processors, the recommendation report to a developer associated with the new version of the page layout; and
   receiving, by the one or more processors, an updated page layout reflecting modifications to the new version of the page layout based on the recommendation report.

2. The computer-implemented method of claim 1, wherein:
   the analyzing of the disparity events is performed based on historical user experience data; and
   the disparity events comprise at least one of user interface mistakes made by the user, mis-navigations made by the user, statistically significant wait times experienced by the user, and non-progressing input provided by the user.

3. The computer-implemented method of claim 1, wherein the disparity events are aggregated over a plurality of users.

4. The computer-implemented method of claim 1, further comprising simulating, by the one or more processors, a change in the new version of the page layout based on a preference of the user.

5. The computer-implemented method of claim 1, wherein the disparity events are captured by analysis of at least one of video input associated with the user and audio input associated with the user.

6. The computer-implemented method of claim 5, wherein the analysis is performed utilizing at least one of natural language processing (NLP) and natural language understanding (NLU).

7. The computer-implemented method of claim 1, wherein the disparity events are logged and timed against individual pages of the program and steps based on a comparison of elements on the individual pages.

8. A system for optimizing a user experience during transition to an updated user interface, comprising:
   one or more processors; and
   one or more memory storing instructions executed by the one or more processors, the instructions, when executed, causing the one or more processors to:
      capture a user experience of a user's interaction with a program based on migration of a user interface from a current version of a page layout associated with the user to a new version of the page layout associated with the user;
      analyze disparity events experienced by the user while transitioning from the current version of the page layout to the new version of the page layout;
      generate a recommendation report of changes to the user interface based on the analyzing;
      send the recommendation report to a developer associated with the new version of the page layout; and
      receive an updated page layout reflecting modifications to the new version of the page layout based on the recommendation report.

9. The system of claim 8, wherein:
   the analyzing of the disparity events is performed based on historical user experience data; and
   the disparity events comprise at least one of user interface mistakes made by the user, mis-navigations made by the user, statistically significant wait times experienced by the user, and non-progressing input provided by the user.

10. The system of claim 8, wherein the disparity events are aggregated over a plurality of users.

11. The system of claim 8, wherein, when executed, the executable instructions further cause the one or more processors to simulate a change in the new version of the page layout based on a preference of the user.

12. The system of claim 8, wherein the disparity events are captured by analysis of at least one of video input associated with the user and audio input associated with the user.

13. The system of claim 12, wherein the analysis is performed utilizing at least one of natural language processing (NLP) and natural language understanding (NLU).

14. The system of claim 8, wherein the disparity events are logged and timed against individual pages of the program and steps based on a comparison of elements on the individual pages.

15. A computer program product for optimizing a user experience during transition to an updated user interface, the computer program product comprising:

one or more non-transitory computer readable storage media, and program instructions collectively stored on the one or more computer readable storage media, the program instructions comprising:

program instructions to capture, by one or more processors, a user experience of a user's interaction with a program based on migration of a user interface from a current version of a page layout associated with the user to a new version of the page layout associated with the user;

program instructions to analyze, by the one or more processors, disparity events experienced by the user while transitioning from the current version of the page layout to the new version of the page layout;

program instructions to generate, by the one or more processors, a recommendation report of changes to the user interface based on the analyzing;

program instructions to send, by the one or more processors, the recommendation report to a developer associated with the new version of the page layout; and program instructions to receive, by the one or more processors, an updated page layout reflecting modifications to the new version of the page layout based on the recommendation report.

16. The computer program product of claim 15, wherein:
the analyzing of the disparity events is performed based on historical user experience data; and
the disparity events comprise at least one of user interface mistakes made by the user, mis-navigations made by the user, statistically significant wait times experienced by the user, and non-progressing input provided by the user.

17. The computer program product of claim 15, wherein the disparity events are aggregated over a plurality of users.

18. The computer program product of claim 15, further including program instructions to simulate, by the one or more processors, a change in the new version of the page layout based on a preference of the user.

19. The computer program product of claim 15, wherein:
the disparity events are captured by analysis of at least one of video input associated with the user and audio input associated with the user; and
the analysis is performed utilizing at least one of natural language processing (NLP) and natural language understanding (NLU).

20. The computer program product of claim 15, wherein the disparity events are logged and timed against individual pages of the program and steps based on a comparison of elements on the individual pages.

* * * * *